US012647156B2

(12) United States Patent　(10) Patent No.: US 12,647,156 B2

Rahman　(45) Date of Patent: Jun. 2, 2026

(54) INTELLIGENT BEAMFORMING LEVERAGING SERVICE TYPE AND MOBILITY DYNAMICS OF INDIVIDUAL USERS

(71) Applicant: T-MOBILE INNOVATIONS LLC, Overland Park, KS (US)

(72) Inventor: Muhammad Tawhidur Rahman, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 75 days.

(21) Appl. No.: 18/370,728

(22) Filed: Sep. 20, 2023

(65) Prior Publication Data

US 2025/0096856 A1　Mar. 20, 2025

(51) Int. Cl.
　*H04B 7/04*　(2017.01)
　*H04B 7/0408*　(2017.01)
　*H04B 7/08*　(2006.01)

(52) U.S. Cl.
　CPC ......... *H04B 7/0408* (2013.01); *H04B 7/0834* (2013.01)

(58) Field of Classification Search
　CPC ............................. H04B 7/0408; H04B 7/0834
　USPC .......................................................... 375/262
　See application file for complete search history.

(56) References Cited

U.S. PATENT DOCUMENTS

2020/0235800 A1* 7/2020 Tang .................... H04B 7/0695

FOREIGN PATENT DOCUMENTS

| JP | 2000022618 | * | 1/2000 |
| KR | 20210051671 | * | 7/2020 |

* cited by examiner

*Primary Examiner* — Leila Malek

(74) *Attorney, Agent, or Firm* — Shook, Hardy & Bacon L.L.P.

(57) ABSTRACT

Systems and methods are provided for intelligent beamforming leveraging service type and mobility dynamics of individual users. Initially, one or more services being provided to a UE over a network are determined by the node. Mobility dynamics corresponding to the UE are also determined by the node. Based on the one or more services and the mobility dynamics, a beam providing a connection between the UE and the network is adjusted at the node. In aspects, the beam may be a broadcast beam or a traffic beam.

14 Claims, 4 Drawing Sheets

*300*

310 — DETERMINE, AT A NODE, ONE OR MORE SERVICES BEING PROVIDED TO A UE OVER A NETWORK

320 — DETERMINE, AT THE NODE, MOBILITY DYNAMICS CORRESPONDING TO THE UE

330 — BASED ON THE ONE OR MORE SERVICES AND THE MOBILITY DYNAMICS, ADJUST, AT THE NODE, A BEAM PROVIDING A CONNECTION BETWEEN THE UE AND THE NETWORK

INTELLIGENT BEAMFORMING LEVERAGING SERVICE TYPE AND MOBILITY DYNAMICS OF INDIVIDUAL USERS

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for intelligent beamforming. More particularly, in aspects set forth herein, systems and methods enable service type and mobility dynamics of individual users to be leveraged by a node to tailor a beam for each user. Initially, one or more services being provided to a UE over a network are determined by the node. Mobility dynamics corresponding to the UE are also determined by the node. Based on the one or more services and the mobility dynamics, a beam providing a connection between the UE and the network is adjusted at the node. In aspects, the beam may be a broadcast beam or a traffic beam.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
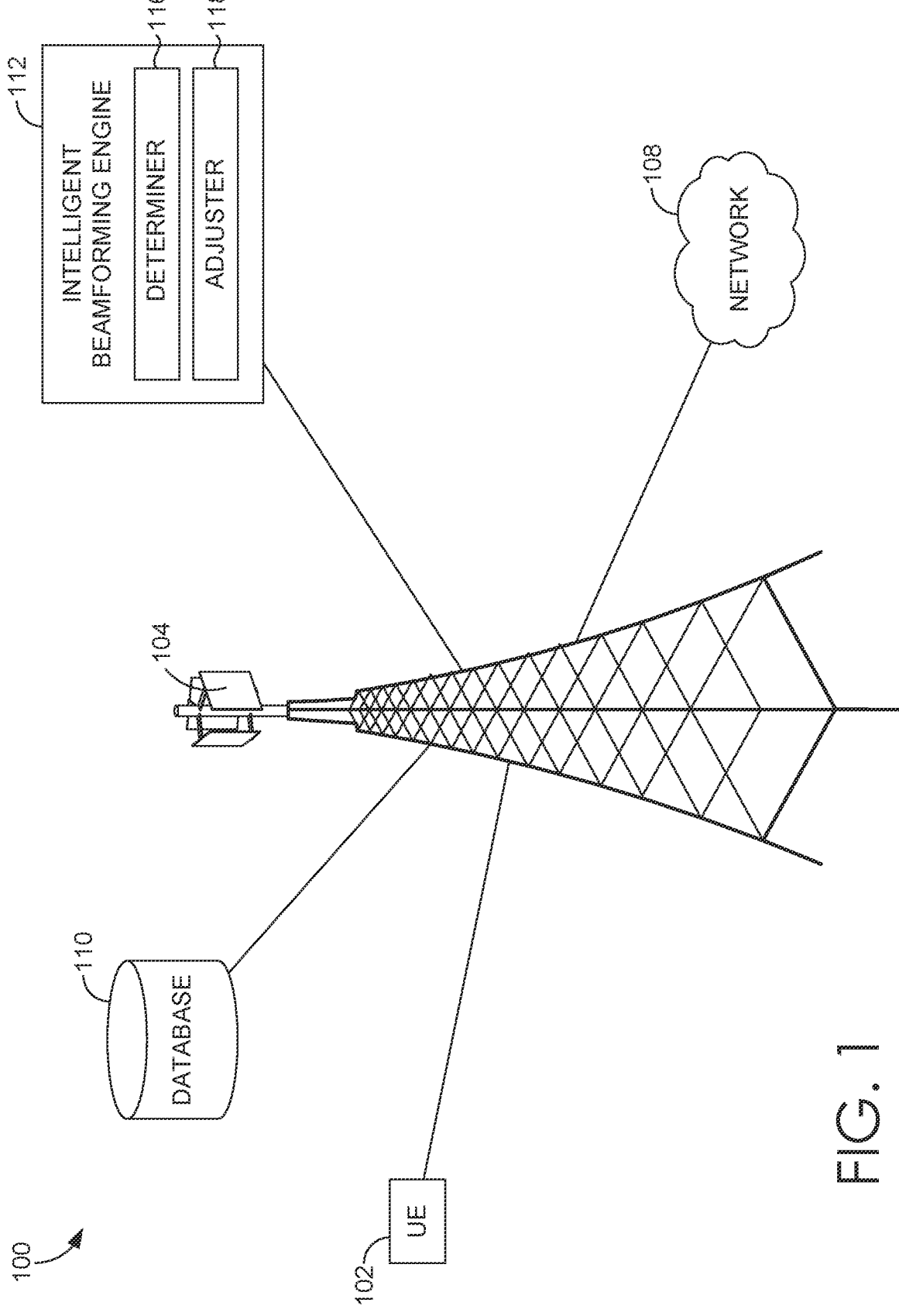
FIG. 1 depicts a diagram of an exemplary network environment in which implementations of the present disclosure may be employed.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

| | |
|---|---|
| 3G | Third-Generation Wireless Technology |
| 4G | Fourth-Generation Cellular Communication System |
| 5G | Fifth-Generation Cellular Communication System |
| 6G | Sixth-Generation Cellular Communication System |
| AI | Artificial Intelligence |
| CD-ROM | Compact Disk Read Only Memory |
| CDMA | Code Division Multiple Access |
| eNodeB | Evolved Node B |
| GIS | Geographic/Geographical/Geospatial Information System |
| gNodeB | Next Generation Node B |
| GPRS | General Packet Radio Service |
| GSM | Global System for Mobile communications |
| iDEN | Integrated Digital Enhanced Network |
| DVD | Digital Versatile Discs |
| EEPROM | Electrically Erasable Programmable Read Only Memory |
| LED | Light Emitting Diode |
| LTE | Long Term Evolution |
| MIMO | Multiple Input Multiple Output |
| MD | Mobile Device |
| ML | Machine Learning |
| PC | Personal Computer |
| PCS | Personal Communications Service |
| PDA | Personal Digital Assistant |
| PDSCH | Physical Downlink Shared Channel |
| PHICH | Physical Hybrid ARQ Indicator Channel |
| PUCCH | Physical Uplink Control Channel |
| PUSCH | Physical Uplink Shared Channel |
| RAM | Random Access Memory |
| RET | Remote Electrical Tilt |
| RF | Radio-Frequency |
| RFI | Radio-Frequency Interference |
| R/N | Relay Node |
| RNR | Reverse Noise Rise |
| ROM | Read Only Memory |
| RSRP | Reference Signal Receive Power |
| RSRQ | Reference Signal Receive Quality |
| RSSI | Received Signal Strength Indicator |
| SINR | Transmission-to-Interference-Plus-Noise Ratio |
| SNR | Transmission-to-noise ratio |
| SON | Self-Organizing Networks |
| TDMA | Time Division Multiple Access |
| TXRU | Transceiver (or Transceiver Unit) |
| UE | User Equipment |
| UMTS | Universal Mobile Telecommunications Systems |
| WCD | Wireless Communication Device (interchangeable with UE) |

Further, various technical terms are used throughout this description. An illustrative resource that fleshes out various aspects of these terms can be found in Newton's Telecom Dictionary, 32$^{nd}$ Edition (2022).

By way of background, a traditional telecommunications network employs a plurality of base stations (i.e., access point, node, cell sites, cell towers) to provide network coverage. The base stations are employed to broadcast and transmit transmissions to user devices of the telecommunications network. An access point may be considered to be a portion of a base station that may comprise an antenna, a radio, and/or a controller. In aspects, an access point is defined by its ability to communicate with a user equipment (UE), such as a wireless communication device (WCD), according to a single protocol (e.g., 3G, 4G, LTE, 5G, and the like); however, in other aspects, a single access point may communicate with a UE according to multiple protocols. As used herein, a base station may comprise one access point or more than one access point. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an eNodeB). In this regard, typically only one active uplink connection can occur per frequency. The base station may include one or more sectors served by individual transmitting/receiving components associated with the base station (e.g., antenna arrays controlled by an eNodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service.

The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network.

For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station or access point. A UE may be, in an embodiment, similar to device 400 described herein with respect to FIG. 4.

In conventional cellular communications technology, beamforming is a signal processing technique that enables a node to send targeted beams of data to users. Not only does this reduce interference, it also makes more efficient use of the frequency spectrum. Beamforming can extend coverage to users using the same amount of energy. By leveraging a narrower beam, beamforming can provide a stronger signal to UEs or provide extended coverage to UEs farther away from the node.

However, by using a narrower beam, non-stationary real-time services (e.g., voice calls or watching a live event over a streaming service while the user is mobile) can be significantly impacted. For example, speech packets or conversational voice packets may not be well decoded if the beam width is comprised and the UE travels outside of the beam range. If the user is traveling at a high rate of speed, the UE may lose the beam entirely or, at the least, suffer from timing alignment issues (i.e., propagation delay due to Doppler shift). In the case of losing the beam entirely, the UE may have to go through the attachment sequence with a different beam, resulting in even more lost packets.

The present disclosure is directed to intelligent beamforming leveraging service type and mobility dynamics of individual users. To do so, one or more services being provided to a UE over a network are initially determined by the node. Mobility dynamics corresponding to the UE are also determined by the node. Based on the one or more services and the mobility dynamics, a beam providing a connection between the UE and the network is adjusted at the node. In aspects, the beam may be a broadcast beam or a traffic beam.

The present disclosure is directed to intelligent beamforming leveraging service type and mobility dynamics of individual users. In this way, a base station can manage and maintain beams for each UE by accounting for mobility dynamics and service differentiation. To explain further, the base station initially determines the mobility dynamics and underlying services the UE is utilizing at any given point of time to determine the right shape and/or orientation of beam for that UE. For example, if the base station determines there is an ongoing voice call (or other use of real-time data) and the UE is moving from point A to point B above a threshold speed, the base station may provide a wider beam or change the orientation of the beam so the UE is less likely to lose the beam. In contrast, if the base station determines the UE is stationary or moving from point A to point B below the threshold speed, the base station may not adjust the beam at all (or if the UE was previously moving above the threshold speed, providing a narrower beam), regardless if there is an ongoing voice call (or other use of real-time data). On the other hand, if the base station determines the UE is utilizing a service that uses buffered data rather than real-time data, the base station may not adjust the beam even if the UE is moving from point A to point B, regardless of the speed.

In a first aspect of the present invention, computer-readable media is provided, the computer-readable media having computer-executable instructions embodied thereon that, when executed, perform a method of intelligent beamforming leveraging service type and mobility dynamics of individual users. The method comprises determining, at a node, one or more services being provided to UE over a network. The method also comprises determining, at the node, mobility dynamics corresponding to the UE. The method further comprises, based on the one or more services and the mobility dynamics, adjusting, at the node, a beam providing a connection between the UE and the network.

A second aspect of the present disclosure is directed to a method of intelligent beamforming leveraging service type and mobility dynamics of individual users. The method comprises determining, at a node, one or more services being provided to UE over a network. The method also comprises determining, at the node, mobility dynamics corresponding to the UE. The method further comprises, based on the one or more services and the mobility dynamics, adjusting, at the node, a beam providing a connection between the UE and the network.

Another aspect of the present disclosure is directed to a system of intelligent beamforming. The system comprises a UE and a node configured to wirelessly communicate with the UE. Then node is configured to: determine one or more services being provided to the UE over a network; determine mobility dynamics corresponding to the UE; and based on the one or more services and the mobility dynamics, adjust a beam providing a connection between the UE and the network.

FIG. 1 provides an exemplary network environment in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 includes user device 102, a first node 104, network 108, database 110, and intelligent beamforming engine 112. In network environment 100, the user device 102 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates via with a node of the wireless network, such as the first node 104, in order to interact with one or more components of the network 108.

Figure 4:
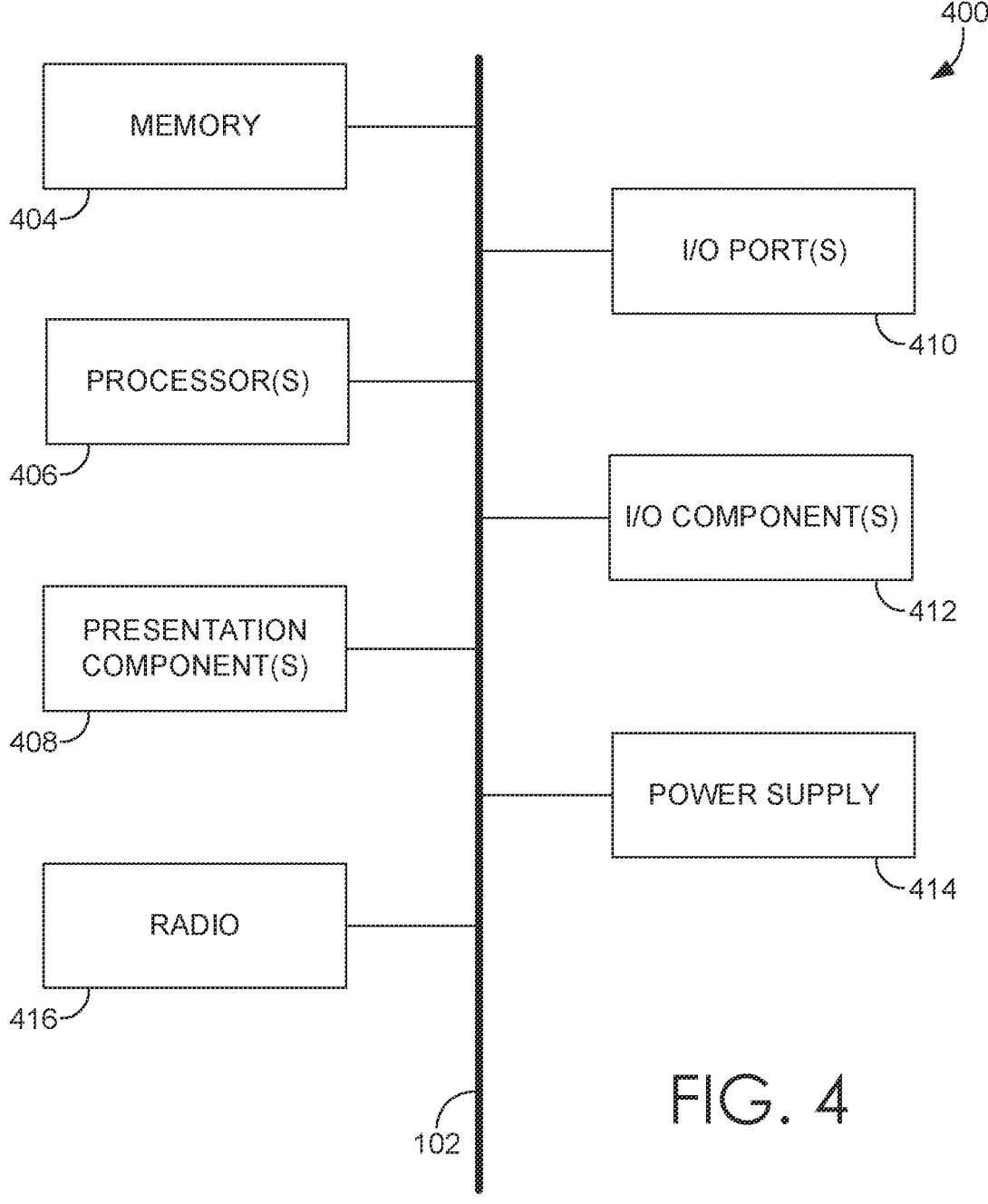
FIG. 4 depicts a diagram of an exemplary computing environment suitable for use in implementations of the present disclosure.

In some aspects, the user device 102 can correspond to computing device 400 in FIG. 4. Thus, a user device can include, for example, a display(s), a power source(s) (e.g., a battery), a data store(s), a speaker(s), memory, a buffer(s), a radio(s) and the like. In some implementations, the user device 102 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 102 may communicate with the node 104 on any one or more frequencies, frequency bands, channels, or the like. Though only the node 104 is depicted in FIG. 1, it should be understood that the user device 102 may be capable of connecting to any one or more of a plurality of nodes, using any one or more of a plurality of communication protocols, on any one or more of a plurality of frequencies.

In some cases, the user device 102 in network environment 100 can optionally utilize network 108 to communicate with other computing devices (e.g., a mobile device(s), a server(s), a personal computer(s), etc.) through the node 104. The network 108 may be a telecommunications network(s), or a portion thereof. A telecommunications network might include an array of devices or components (e.g., one or more base stations, servers, computer processing components), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network 108 can include multiple networks, as well as being a network of networks, but is shown in more simple form so as to not obscure other aspects of the present disclosure.

Network 108 can be part of a telecommunication network that connects subscribers to their immediate service provider. In some instances, network 108 can be associated with a telecommunications provider that provides services (e.g., voice, data, SMS) to user devices, such as user device 102. For example, network 108 may provide voice, SMS, and/or data services to user devices or corresponding users that are registered or subscribed to utilize the services provided by a telecommunications provider. Network 108 can comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), or a 5G network.

In some implementations, the first node 104 is configured to communicate with user devices, such as the user device 102 that are located within the geographical area, or cell, covered by the one or more antennas of the first node 104. Said area may be referred to herein as a geographic coverage area, sector, or the like. Though referred to as a node for simplicity, the first node 104 may include (or be communicatively coupled to) one or more base stations, nodes, base transmitter stations, radios, antennas, antenna arrays, power amplifiers, transmitters/receivers, digital signal processors, control electronics, GPS equipment, and the like. In particular, the node 104 may transmit a variety of downlink signals to the user device 102 in an effort to establish a wireless communication session. Notably, these downlink signals include one or more synchronization signals. Synchronization signals, as used herein, are meant to refer to any of a variety of particular signals (e.g., a primary synchronization signal (PSS), secondary synchronization signal (SSS), and/or a physical broadcast channel indicator (PBCH)), and/or a block combination of one or more synchronization signals (e.g., a synchronization signal block (SSB) which may comprise a PSS, SSS, and a PBCH). The synchronization signal transmitted from the node 104 to the user device 102 may be used for any beneficial purpose; for example, the synchronization signal may be used to provide channel and timing information that the user device 102 may use to precisely time transmission, guard, and receive action(s). Conversely, when the user device 102 is not regularly provided with synchronization signals, particularly if the user device 102 is in motion, it may not appropriately transmit in the uplink, increasing interference, increasing packet drops, increasing call failure, or any one or more of many different undesirable network conditions.

The synchronization signals transmitted in the downlink by the node 104 may be broadcasted in distinct beams that are meant to serve a particular portion of the geographic service area served by the node 104. The geographic service area of the node 104 may be divided into a plurality of subsectors (i.e., coverage area sections). Utilizing advanced antenna arrays (e.g., a massive MIMO array comprising 8, 32, 64, 128 antennas), the node 104 may transmit a plurality of distinct beams, each distinct beam serving a distinct subsector for the purpose of propagating synchronization signals. Further, and as referred to herein, it may be said that the node 104 transmits a series of synchronization signals to each subsector; that is, the node 104 may transmit a first synchronization signal to a first subsector at a first time using a first beam, and after the node 104 performs a complete beam sweeping protocol, the node may transmit a second synchronization signal to the first subsector at a second time using the first beam. While the first and second synchronization may comprise the same or similar information, the term "series" is meant to define the cyclic/periodic transmissions that would be observed/received by a user device in the first subsector (assuming that the user device 102 is not observing/receiving synchronization signals from any of the second or subsequent beams that are meant to serve the second or subsequent subsectors).

The node 104 may be in communication with the intelligent beamforming engine 112, which comprises various components that are utilized, in various implementations, to perform one or more methods for intelligent beamforming leveraging service type and mobility dynamics of individual users. In some implementations, such as the one depicted in FIG. 1, the intelligent beamforming engine 112 comprises components including a determiner 116 and an adjuster 118. However, in other implementations, more or less components than those shown in FIG. 1 may be utilized to carry out aspects of the invention described herein. Though shown as a separate entity, the intelligent beamforming engine 112 may take the form of one or more software stacks, modules, applications, etc., may be executed and/or located at a single location or a plurality of locations, and may executed by one or more network components, or may provide instructions for execution at a location remote to the intelligent beamforming engine.

The determiner 216 of the intelligent beamforming engine 112 is generally configured to receive information from a UE. The determiner 216 determines one or more services being provided to the UE. The one or more services may comprise voice, real-time data, or buffered data. For example, a user associated with the UE may be making a voice call. In another example, the user associated with the UE may be utilizing an application on the UE that uses real-time data. In yet another example, the user associated with the UE may be utilizing an application that uses buffered data.

The determiner 216 also determines mobility dynamics corresponding to the UE. Mobility dynamics may comprise a direction and a speed corresponding to the UE. For example, a user associated with the UE may be stationary and the mobility dynamics would reflect that the UE is not moving in any direction or at any speed. In another example, the user associated with the UE may be in a moving car and the mobility dynamics would reflect that the UE is moving in a particular direction relative to the node and at a particular speed.

The adjuster 220 is generally configured to make adjustments to a beam corresponding to a particular UE if adjustments are warranted. For example, the orientation of the beam may be adjusted to track mobility dynamics corresponding to the UE if the UE is providing voice or real-time services. In another example, the width of the beam may be adjusted to track mobility dynamics corresponding to the UE if the UE is providing voice or real-time services. In yet another example, the periodicity of the beam may be adjusted if the mobility dynamics indicate the UE is moving above a threshold speed. In some aspects, the beam is a broadcast beam. In other aspects the beam is a traffic beam.

Figure 2:
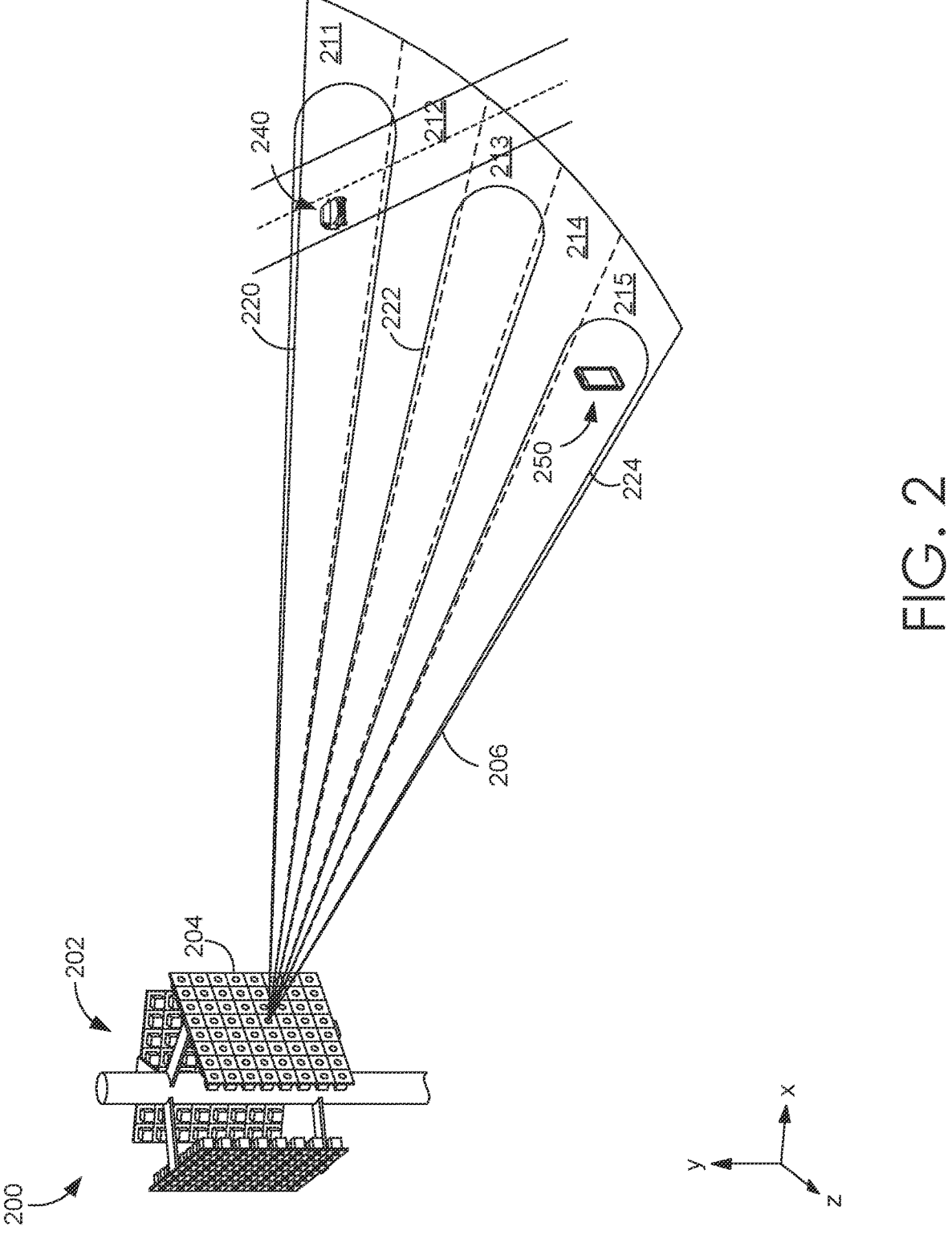
FIG. 2 depicts a representation of a wireless network in which one or more aspects of the present disclosure may be carried out, in accordance with aspects herein.

Turning now to FIG. 2, a representation of a wireless network is provided that illustrates intelligent beamforming in accordance with aspects herein may be carried out. The representation is but one example of a suitable configuration and are not intended to suggest any limitations as to the scope of use or functionality of embodiments described herein. Neither should the configuration be interpreted as having any dependency or requirement relating to any one or combination of components discussed herein with respect to FIGS. 1-4. FIG. 2 illustrates a system 200 comprising a cell 202. The cell 202 may comprise any one or more components of the intelligent beamforming engine 112 and the network 108 of FIG. 1 and is communicatively coupled to or may be said to comprise an antenna array 204. Though shown as a massive MIMO array having 64 transmit and 64 receive elements, the antenna array 204 may be any configuration that is suitable for transmitting a plurality of distinct beam forms. The antenna array 204 is generally configured to provide wireless telecommunication services for user devices within a sector, or geographic service area 206. For illustrative purposes, the geographic service area 206 is functionally divided into a plurality of distinct subsectors 211-215 (though the subsectors 211-215 are shown as discrete (i.e., mutually exclusive or non-overlapping), the usage of the term "distinct" is meant to describe a condition where a first subsector 211 and an adjacent second subsector 212 encompass different geographic areas, whether or not the first subsector 211 and the second subsector 212 have at least some overlap).

As illustrated, the antenna array 204 is configured to transmit a signal to each of the subsectors 211-215 using a distinct beam. That is, a first beam 220 used to transmit a signal to the first subsector 211 is distinct from a second beam 222, which is used to transmit a signal to a third subsector 213, which is distinct from a third beam 224, which is used to transmit a signal to a fifth subsector 215. Each of the beams 220, 222, 224 may be a broadcast beam (such as may be used to transmit a synchronization signal) or a traffic beam (such as may be used to transmit data).

By way of example, consider UE 240 traveling in a vehicle. As shown, UE 240 is provided service in subsector 211 by beam 220. Eventually, UE 240 will travel outside of subsector 211 and range of beam 220. If UE 240 is utilizing voice or other real-time services, as UE 240 travels, voice and/or data packets may be lost. Even if UE 240 travels into a different subsector and attaches to a different beam, UE 240 will have to go through will an attachment sequence and voice and/or data packets will still be lost. However, if an adjustment is made to the beam 220, such as by making it wider or changing its orientation, UE 240 can maintain a connection to beam 220, even if it travels outside subsector 211, and voice and/or data packets will not be lost.

In some aspects, even if UE 240 is utilizing voice or other real-time services, if it is not traveling above a threshold speed, an adjustment to the beam 220 may not be necessary. In other aspects, even if UE 240 is traveling above a threshold speed, if UE 240 is not utilizing voice or real-time services, an adjustment to the beam 220 may not be necessary.

In another example, consider stationary UE 250. As shown, UE 250 is provided service in subsector 215 by beam 224. Even if the UE 250 is utilizing voice or other real-time services, since it is stationary, an adjustment to the beam 224 may not be necessary. In some aspects, if beam 224 had previously been adjusted because mobility dynamics indicated UE 250 was moving above a threshold speed, an adjustment to the beam 224 may be made to narrow the beam if UE 250 drops below the threshold speed, changes direction, becomes stationary, or ceases using voice or other real-time services.

Figure 3:
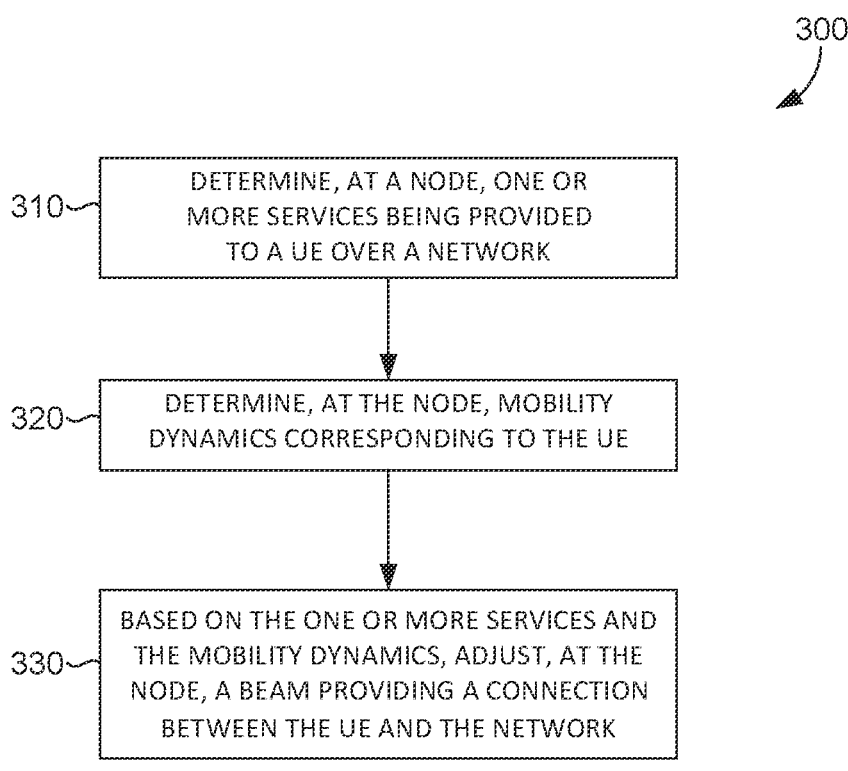
FIG. 3 depicts a flow diagram of a method for intelligent beamforming, in accordance with aspects herein.

In FIG. 3, a flow diagram is provided depicting a method 300 for intelligent beamforming leveraging service type and mobility dynamics of individual users, in accordance with aspects of the present invention. Method 300 may be performed by any computing device (such as computing device described with respect to FIG. 4) with access to an intelligent beamforming engine (such as the one described with respect to FIG. 1) or by one or more components of the network environment described with respect to FIG. 1 (such as UE 102, base station 104, or intelligent beamforming engine 112).

Initially, at step 310, one or more services being provided to user equipment (UE) over a network are determined at a node. The one or more services may comprise one or more services comprises voice, real-time data, or buffered data. For example, a user associated with the UE may be making a voice call. In another example, the user associated with the UE may be utilizing an application on the UE that uses real-time data, such as watching a live streaming video on YOUTUBE LIVE. In yet another example, the user associated with the UE may be utilizing an application that uses buffered data, such as watching a movie on NETFLIX.

At step 320, mobility dynamics corresponding to the UE are also determined at the node. Mobility dynamics may comprise a direction and a speed corresponding to the UE. For example, a user associated with the UE may be stationary and the mobility dynamics would reflect that the UE is not moving in any direction or at any speed. In another example, the user associated with the UE may be in a moving car and the mobility dynamics would reflect that the UE is moving in a particular direction relative to the node and at a particular speed.

At step 330, based on the one or more services and the mobility dynamics, a beam providing a connection between the UE and the network is adjusted at the node. For example, the orientation of the beam may be adjusted. In another example, the width of the beam may be adjusted. In each example, the beam is adjusted to track the mobility dynamics corresponding to the UE. In some aspects, the beam is a broadcast beam. In other aspects the beam is a traffic beam.

Embodiments of the technology described herein may be embodied as, among other things, a method, a system, or a computer-program product. Accordingly, the embodiments may take the form of a hardware embodiment, or an embodiment combining software and hardware. The present technology may take the form of a computer-program product that includes computer-useable instructions embodied on one or more computer-readable media. The present technology may further be implemented as hard-coded into the mechanical design of network components and/or may be built into a broadcast cell or central server.

Computer-readable media includes both volatile and non-volatile, removable and non-removable media, and contemplate media readable by a database, a switch, and/or various other network devices. Network switches, routers, and related components are conventional in nature, as are methods of communicating with the same. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and other data representations. Computer storage media may include, but are not limited to, RAM, ROM, EEPROM, flash memory or other memory technology, CD-ROM, digital versatile discs (DVD), holographic media or other optical disc storage, magnetic cassettes, magnetic tape, magnetic disk storage, and/or other magnetic storage devices. These memory components may store data momentarily, temporarily, and/or permanently, and are not limited to the examples provided.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 4, a block diagram of an exemplary computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. It should be noted that although some components in FIG. 4 are shown in the singular, they may be plural. For example, the computing device 400 might include multiple processors or multiple radios. In aspects, the computing device 400 may be a UE/WCD, or other user device, capable of two-way wireless communications with an access point. Some non-limiting examples of the computing device 400 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 410 that directly or indirectly couples various components together, including memory 412, processor(s) 414, presentation component(s) 416 (if applicable), radio(s) 424, input/output (I/O) port(s) 418, input/output (I/O) component(s) 420, and power supply(s) 422. Although the components of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 412 may take the form of memory components described herein. Thus, further elaboration will not be provided here, but it should be noted that memory 412 may include any type of tangible medium that is capable of storing information, such as a database. A database may be any collection of records, data, and/or information. In one embodiment, memory 412 may include a set of embodied computer-executable instructions that, when executed, facilitate various functions or elements disclosed herein. These embodied instructions will variously be referred to as "instructions" or an "application" for short.

Processor 414 may actually be multiple processors that receive instructions and process them accordingly. Presentation component 416 may include a display, a speaker, and/or other components that may present information (e.g., a display, a screen, a lamp (LED), a graphical user interface (GUI), and/or even lighted keyboards) through visual, auditory, and/or other tactile cues.

Radio 424 represents a radio that facilitates communication with a wireless telecommunications network. Illustrative wireless telecommunications technologies include CDMA, GPRS, TDMA, GSM, and the like. Radio 424 might additionally or alternatively facilitate other types of wireless communications including Wi-Fi, WiMAX, LTE, 3G, 4G, LTE, mMIMO/5G, NR, VOLTE, or other VoIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 418 may take a variety of forms. Exemplary I/O ports may include a USB jack, a stereo jack, an infrared port, a firewire port, other proprietary communications ports, and the like. Input/output (I/O) components 420 may comprise keyboards, microphones, speakers, touchscreens, and/or any other item usable to directly or indirectly input data into the computing device 400.

Power supply 422 may include batteries, fuel cells, and/or any other component that may act as a power source to supply power to the computing device 400 or to other network components, including through one or more electrical connections or couplings. Power supply 422 may be configured to selectively supply power to different components independently and/or concurrently.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for intelligent beamforming leveraging service type and mobility dynamics of individual users, the method comprising:

determining, at a node associated with a first beam oriented to a first subsector and a second beam oriented to a second subsector, one or more services being provided to user equipment (UE) over a network;

determining, at the node, that the UE is traveling above a threshold speed; and based on the one or more services and that the UE is traveling above the threshold speed, adjusting, at the node, the first beam providing a connection between the UE and the network to be oriented from the first subsector to the second subsector and adjusting a periodicity of the first beam.

2. The media of claim 1, wherein the one or more services comprises voice or real-time data.

3. The media of claim 1, wherein the first beam is a broadcast beam.

4. The media of claim 1, wherein the first beam is a traffic beam.

5. The media of claim 1, wherein adjusting the first beam comprises adjusting a width of the first beam.

6. A method for intelligent beamforming leveraging service type and mobility dynamics of individual users, the method comprising:

determining, at a node associated with a first beam oriented to a first subsector and a second beam oriented to a second subsector, one or more services being provided to user equipment (UE) over a network;

determining, at the node, that the UE is traveling above a threshold speed; and based on the one or more services and that the UE is traveling above the threshold speed, adjusting, at the node, the first beam providing a connection between the UE and the network to be oriented from the first subsector to the second subsector and adjusting a periodicity of the first beam.

7. The method of claim 6, wherein the one or more services comprises voice or real-time data.

8. The method of claim 6, wherein the first beam is a broadcast beam.

9. The method of claim 6, wherein the first beam is a traffic beam.

10. The method of claim 6, wherein adjusting the first beam comprises adjusting a width of the first beam.

11. A system for intelligent beamforming leveraging service type and mobility dynamics of individual users, the system comprising:

a user equipment (UE); and a node, associated with a first beam oriented to a first subsector and a second beam oriented to a second subsector, and configured to wirelessly communicate with the UE, wherein the node is configured to:

determine one or more services being provided to the UE over a network;

determine that the UE is traveling above a threshold speed; and based on the one or more services and that the UE is traveling above the threshold speed, adjust the first beam providing a connection between the UE and the network to be oriented from the first subsector to the second subsector and adjusting a periodicity of the first beam.

12. The system of claim 11, wherein the one or more services comprises voice or real-time data.

13. The system of claim 11, wherein the first beam is a broadcast beam or a traffic beam.

14. The system of claim 11, wherein adjusting the first beam comprises adjusting a width of the first beam.

* * * * *